Feb. 17, 1931.  H. G. FOURCADE  1,793,217
PHOTOGRAPHIC SURVEYING
Filed Feb. 26, 1927   4 Sheets-Sheet 4
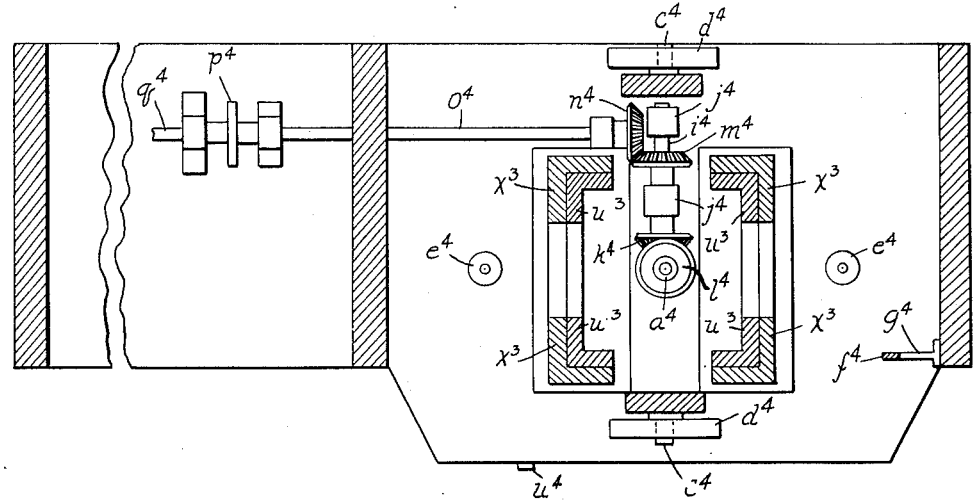
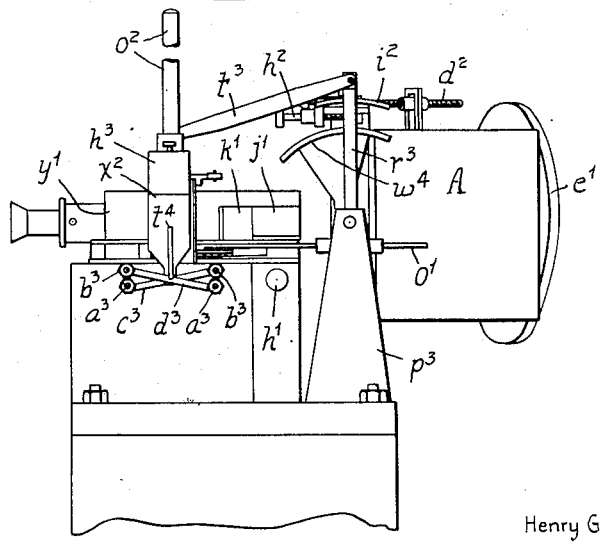
Henry Georges Fourcade
INVENTOR
BY
his ATTORNEY Patented Feb. 17, 1931

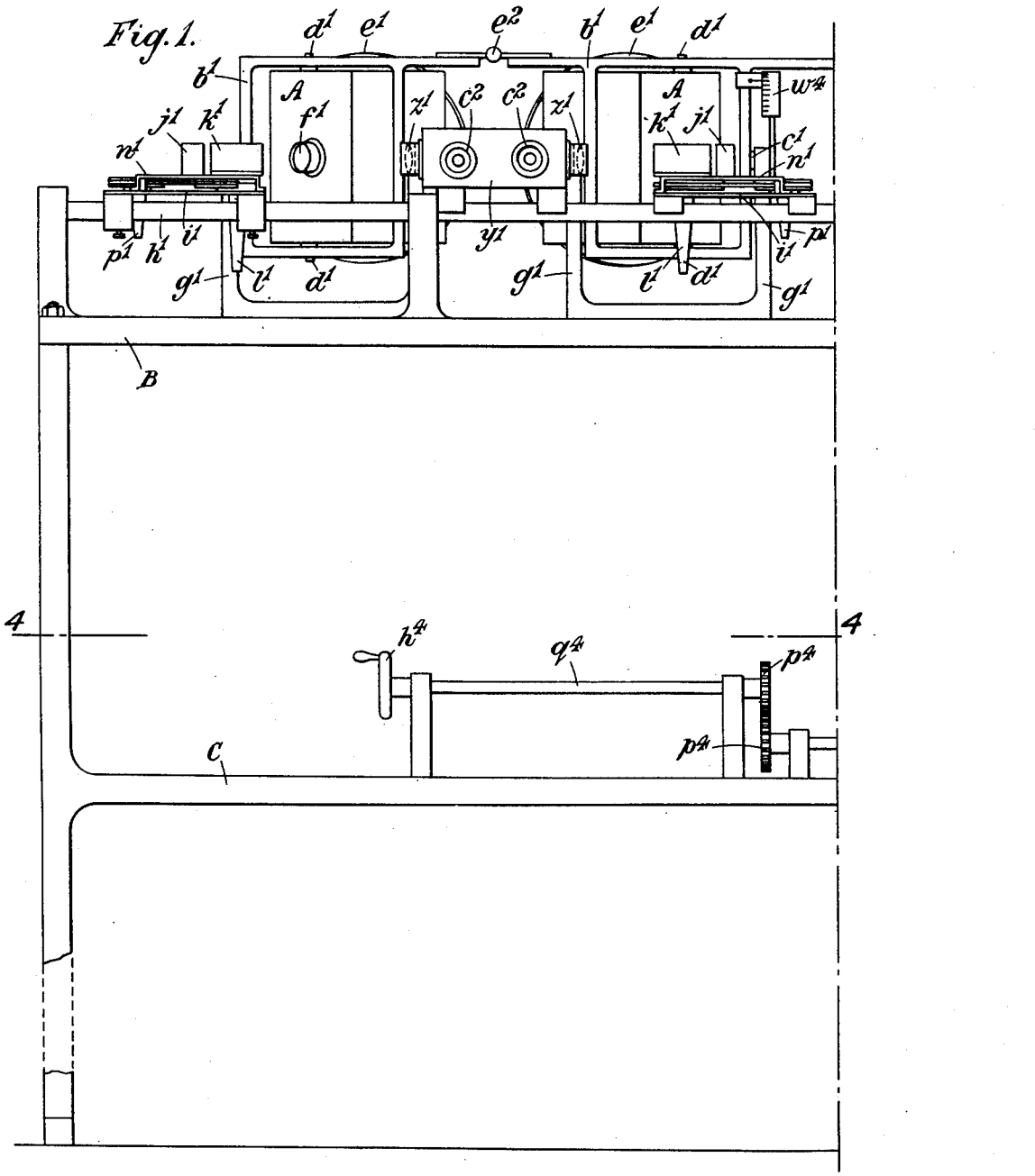

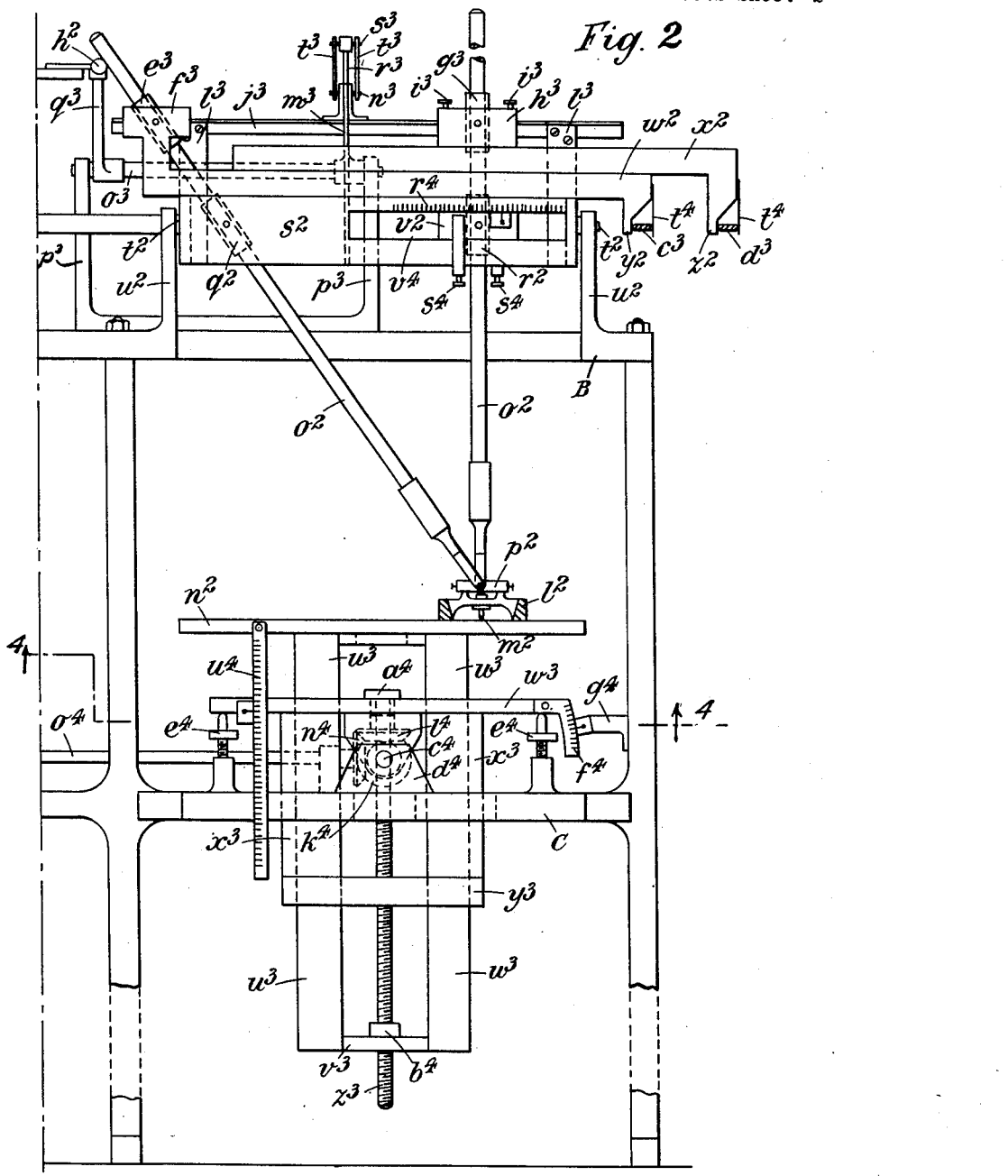

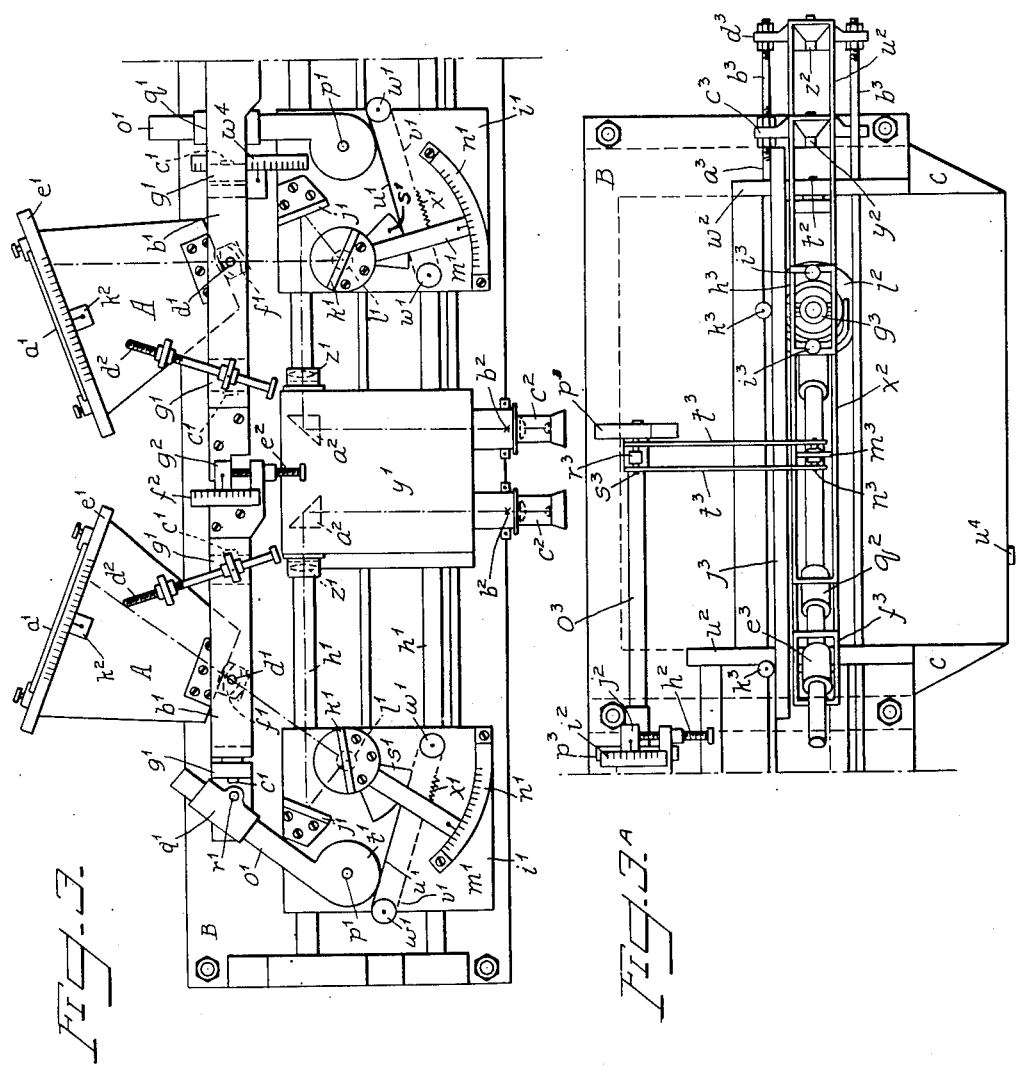

1,793,217

UNITED STATES PATENT OFFICE

HENRY GEORGES FOURCADE, OF HUMANSDORP, CAPE COLONY, SOUTH AFRICA

PHOTOGRAPHIC SURVEYING

Application filed February 26, 1927, Serial No. 171,325, and in Great Britain July 19, 1926.

This invention relates to a device and method for determining the position in space of points shown on a pair of serial photographs, taken from two different points of view, and for tracing on a plane surface a map of the surface represented. Several devices of the kind have hitherto become known. The setting of photographs in those devices has always required a prior knowledge or determination, of the relative positions in space in which the photographs were taken.

It is the object of the present invention to render possible, in a measuring device, or a measuring and mapping device, the setting of two photographs in correspondence, that is to say in the relative positions, excepting distance apart, they occupied in space during exposure, without any necessary prior knowledge or determination of the correspondence, and to provide novel and simpler means for measuring elements of the surface represented, or for producing a map of the surface.

The method employed is based upon the following new theorem: The correspondence between the pencils of rays joining two centres to any number of points in space is uniquely determined if to five rays of the one there are given five rays in the other, provided no three pairs of the rays lie in a plane.

According to this invention the device has the following characteristic features. Two photogoniometers, carrying photographs obtained as the result of exposures and objectives disposed in the centre of projection of the photographs, are mounted so that each of them can be turned separately about a "polar" axis, common to both, which is conveniently disposed horizontally, and also about a "declination" axis normal to this polar axis and parallel to the plane of the plate, while, further, each plate can be rotated, in its own plane about an axis passing through the centre of its photogoniometer lens and normal to the plane of the plate. These movements allow the plates to be set at any inclination or orientation to each other, and, particularly, so as to bring the images on these plates in correspondence. Light rays passing through the plates and lenses of the photogoniometers are reflected by means of mirrors, or prisms, into a fixed binocular telescope, provided with sighting marks, where they combine to form a stereoscopic image. The mirrors or prisms are mounted on slides arranged to move parallel to the polar axis and, by displacing the slides suitably, the stereoscopic image can be traversed across the field of vision in one direction, while traversing the image in a direction at right angles is effected by swinging the two photogoniometers similarly and simultaneously together around the polar axis. These movements enable any portion of the stereoscopic picture to be brought into the field of vision and, in consequence, the sighting marks in the telescope can be located over any place in the image. Graduation on circles, arc, or otherwise arranged, enable readings to be obtained of the various movements imparted to parts of the apparatus.

The following is a convenient arrangement which may be adopted for the mirror system by means of which the rays from the photogoniometers are reflected into the telescope. On each of the slides moving along fixed guides parallel to the polar axis are mounted two mirrors of suitable construction one of these mirrors being fixed and disposed so as to reflect light rays which fall upon it into one of the telescope lenses. Adjacent to the fixed mirror there is mounted a second mirror adapted to reflect light rays passing through the lens of the photogoniometer into the fixed mirror. This second mirror can swing about a vertical pivot and is connected, by means of gearing, pulleys, or other suitable mechanism, with a lever, also pivoted vertically on the slide, in such manner that the angular movement of the lever about its axis is always double that of the mirror about its axis. This lever passes through a guide carried on a fixed vertical pivot in the vertical of the polar axis. The distance between the axis of this pivot and the declination axis of the photogoniometer is made equal to the distance between the centres about which the lever and the mirror respectively are pivoted on the slide, while a line between these two pivot centres on the slide is parallel to the polar axis. In consequence the angular movement of the mirror will be always half that of a line between the pivot centre of the mirror and the declination axis of the photogoniometer, so that rays of any incidence through this declination axis, which passes substantially through the front nodal point of the lens, will be reflected by the pivoted mirror in a constant direction into the fixed mirror and thence to the telescope.

The angle which the sighting line makes with the polar axis is then given by double the amount of rotation of the pivoted mirror, reckoned from a suitable index.

If the longitudinal guides are made sufficiently straight it is further possible to dispense with the fixed mirrors and to arrange for the rays from each photogoniometer to be reflected directly into the corresponding telescope objective. In that case the right angles prisms which would otherwise be employed within the telescope are replaced by double reflection prisms in order to preserve the erection of the image.

In the absence of a knowledge of the vertical, plates which were substantially horizontal when exposed, although they can be utilized, are not so well conditioned for setting into correspondence as are inclined plates. Inclined plates are therefore as a rule preferable.

To set a pair of plates into correspondence it is necessary and sufficient to bring five suitable points common to the two plates into correspondence, that is to say, to make both images of each point appear at the same height in the field of view of the respective telescope.

Turning now to the mapping system, this may be constructed in the following manner. Two rods which may be called the mapping rods are connected by means of a cardan joint to a pencil carrier which can move freely over the surface of a drawing board. These two rods are so mounted that they can swing together about an axis parallel to the polar axis of the main part of the apparatus. A coupling member is provided between the mapping rods and the pair of photogoniometers such that, as the rods are swung about their parallel axis, the pair of photogoniometers swing similarly about their polar axis. Each of the mapping rods passes first through a pivoted guide sleeve on the parallel axis and secondly through a similar sleeve carried by caliper-like members which can slide along a path parallel to the parallel axis. The ends of the caliper-like members turn down to the parallel axis and are connected by rods to the slides of the main apparatus on which the mirrors are mounted, so as to make the displacement of each mirror slide constantly equal to that of the end of the corresponding caliper-like member.

The two guide sleeves carried by the caliper-like members are maintained at the same constant distance from the parallel axis, this distance being equal to the distance between the polar axis of the main apparatus and the axis of the lever which is pivoted on the sliding mirror carrier referred to above.

If now the device has been properly set and since rotation of the pair of photogoniometers about the polar axis will cause similar and corresponding rotation, about the parallel axis, of the plane in which lie the mapping rods, and by reason of the connections between the sliding caliper-like members and the sliding mirror carriers of the main apparatus it follows that provided the sighting mark is maintained on the surface of the apparent optical model, the pencil point will trace in space a copy of the optical model to any scale, within the range of the apparatus, determined by the ratio of the distance between the pivot centres of those guide sleeves for the mapping rods which lie on the parallel axis of the mapping system, to the length of the base.

The details of construction may be modified as found desirable in order to adapt the apparatus for particular uses.

Referring to the accompanying drawings,

Figures 1-5 show a constructional example of a device according to the invention for measuring, and copying on a plane surface, linear elements of the surface to be obtained from a pair of photographs of a spatial form.

Figure 1 is a side elevational view of the left half of the machine, certain parts being omitted for the sake of clearness.

Figure 2 is a similar view of the right half of the machine.

Figure 3 is a plan view of the left half of the machine.

Figure 3$^A$ is a plan view of the right half of the machine.

Figure 4 a section on line 4—4 of Figure 2, and

Figure 5 an end elevation of the upper part of the apparatus.

Two photogoniometers A hold a pair of photographic plates $a^1$ obtained as the result of exposures, and are mounted on a frame $b^1$ in such manner that each can be turned separately about a common "polar" axis of rotation, determined by pivots $c^1$ which are disposed horizontally and in alignment and also about a "declination" axis, determined by the pivots $d^1$, which is at right angles to the polar axis and parallel to the plane of the plate. Further each plate can be turned in its own plane, by rotating the "position" circle $e^1$ on which it is carried, about an axis which is normal to the plate and at right angle to the declination axis of its photogoniometer. The three axes about which the plate can be moved pass through, or close to, the front nodal point of the lens $f^1$ of its photogoniometer, the back nodal point of this lens being at the centre of projection of the photograph.

The pivots $c^1$ of the frames $b^1$ rest in uprights $g^1$ carried by the base plate plate B.

In front of the polar axis, and parallel to it, are mounted, on the base plate B, two guide bars $h^1$ on which two slides $i^1$ move longitudinally. Each of the slides carries a fixed mirror $j^1$, another mirror $k^1$ rotating about a vertical axis $l^1$, an index arm $m^1$ moving with the mirror $k^1$ and a graduated arc of circle $n^1$ on which the angular rotation of the mirror $k^1$ may be read. Further, on each slide is disposed a lever arm $o^1$ pivoted at $p^1$, the free end of which passes through a guide sleeve $q^1$ pivoted at a fixed point $r^1$ on the stand of the instrument. The pivot $r^1$ is in the vertical of the polar axis, and the distance between the axis of this pivot, which is vertical, and the declination axis of the corresponding photogoniometer is equal to the distance between the centers $p^1$ and $l^1$ about which the lever $o^1$ and the mirror $k^1$, respectively, are pivoted on the slide, while a line between these two pivot centres $p^1$ and $l^1$ is parallel to the polar axis. The rotation of the mirror $k^1$ is constrained to be always half that of the lever $o^1$, by means of two pulleys or segments of pulleys $s^1$ and $t^1$, the radius of the segment $s^1$ being double that of the pulley $t^1$. The two pulleys are connected by a steel band or other form of belt $u^1$, fixed to both and kept in proper tension by means of a cord $v^1$, also attached to the pulleys, which passes round two wheels $w^1$ and is kept taut by a spring $x^1$.

Light rays passing through the plates and lenses of the photogoniometers are reflected by the mirrors $j^1$ and $k^1$ into the fixed binocular telescope $y^1$ consisting of two objectives $z^1$ two single reflection prisms $a^2$ a pair of sighting marks $b^2$ and a pair of eyepieces $c^2$. The setting of each photogoniometer about its declination axis is effected by means of the screws $d^2$ which are omitted from Figure 1 for the sake of clearness. The setting about the polar axis of the left hand photogoniometer relatively to the right hand photogoniometer is effected by means of the difference screw $e^2$, the graduated arc of circle $f^2$ and the index mark $g^2$. The setting about the polar axis of the pair of photogoniometers relatively to the mapping system is effected by means of the levelling screw $h^2$, the graduated arc of circle $i^2$ and the index mark $j^2$, and the settings in position angle of the two plates is effected by rotating the graduated position circles $e^1$ relatively to the index marks $k^2$. The graduated arc of circle $w^4$ serves to measure the common rotation of the pair of photogoniometers after they have been set in correspondence.

The mapping system is constructed in the following manner. A carrier $l^2$ (Fig. 1) is provided for a pencil $m^2$, this carrier being smooth and plane on the under surface, so as to move freely over the surface of a sheet of paper disposed on the drawing board $n^2$ which is accurately plane. The ends of two rods $o^2$ are connected by means of a cardan joint $p^2$ with one axis at right angles to the plane of the rods and the centre of rotation of the cardan joint in the line of the pencil lead. These two rods, which may be termed the mapping rods, diverge and pass through sleeves $q^2$ and $r^2$ which are pivoted, on a transverse member $s^2$, perpendicularly to the plane of the rods and in the line of the axis of rotation of the transverse member, determined by the pivots $t^2$ at its ends.

The transverse member $s^2$ is formed of a pair of slotted guide bars disposed on either side of the mapping rods $o^2$ and connected together at the ends which carry the pivots $t^2$. The axis of rotation of this transverse member is disposed parallel to the polar axis of the instrument and may be termed the parallel axis. The pivots of the transverse member rest in uprights $u^2$ arising from the base plate B. The pivots of the sleeve $q^2$ are fixed to the transverse member. The other sleeve $r^2$ is pivoted on a movable sliding box $v^2$. The distance between the pivot centres of these two guide sleeves can therefore be adjusted by displacing the box $v^2$ with its guide sleeve $r^2$ along the slot $v^4$ in the transverse member of the mapping system.

Two caliper members $w^2$ $x^2$ are provided which can slide relatively and also along the transverse member $s^2$. The sliding movement of these caliper members is parallel to each other and to the parallel axis of the mapping system, the caliper members being disposed on the side of the parallel axis remote from the pencil carrier. Each of the caliper members, which consist of a pair of rules, suitably braced together and between which the rods $o^2$ pass, is provided with an end turned at right angles to its main part and the points $y^2$ $z^2$ of these turned down ends, which lie in the parallel axis, are connected by means of pairs of distance rods $a^3$ $b^3$ which are shown on Figures 3 and 5 (but are omitted from Figure 1 for the sake of clearness) disposed parallel to the polar axis, and cross heads $c^3$ $d^3$ which in Figure 2 are only shown in section, with the slides of the main apparatus, on which are mounted the mirrors. The connection between the cross-heads and the caliper ends is effected by studs at $y^2$ and $z^2$ against which the cross-heads are pressed by flat springs $t^4$ (Figure 2), so that the caliper ends may swing freely with the mapping rods $o^2$ and the transverse member, about the parallel axis, without affecting the cross-heads $c^3$ $d^3$ or the pairs of rods $a^3$ $b^3$ attached to them, while at the same time the longitudinal motion of the calipers is transmitted to the mirror slides of the main apparatus. The point $y^2$ is connected by the pair of rods $a^3$ with the left hand mirror slide, and the point $z^3$ by the pair of rods $b^3$ with the right hand mirror slide.

On each caliper member is disposed a pivoted guide sleeve through which passes one of the mapping rods $o^2$. The left hand sleeve $e^3$ is pivoted to the box-like end $f^3$ of a fixed arm of the lower caliper member $w^2$. The right hand sleeve $g^3$ is pivoted upon a box-like slide $h^3$ which may be displaced along the upper caliper member $x^2$ and fixed in any suitable position by means of the clamping screws $i^3$. The two guide sleeves $e^3$ $g^3$ carried by the caliper members are pivoted at an equal distance from the axis of the shaft terminated by the pivots $l^2$, $t^2$ of Fig. 2, this distance being equal to the distance between the polar axis of the main apparatus and the axis of the lever which is pivoted on each sliding mirror carrier of the main apparatus. The upper and lower surfaces of the caliper members and the upper surface of the transverse member being all accurately plane and parallel this distance remains invariable whatever the positions of the guides sleeves $e^3$ $g^3$ relatively to the transverse member may be. Each of the box ends $f^3$ $h^3$ which are of equal thickness is pressed at a stud against a guide bar $j^3$ by means of spring rollers $k^3$ carried by the box ends. The guiding edge of this bar is kept at a distance from the parallel axis equal to that of the pivots of the sleeves $e^3$ $g^3$ from the same axis by supports $l^3$ and $m^3$ fixed to the transverse member. On a prolongation of the middle support $m^3$ and in the plane of the axes of the mapping rods $o^2$ is fixed a pivot $n^3$ at an arbitrary distance from the parallel axis.

The coupling of the rotation of the plane of the mapping rods about the parallel axis with the rotation of the pair of photogoniometers about the polar axis is effected in the following manner. A shaft $o^3$, disposed in the line of the polar axis and supported by uprights $p^3$ arising from the base plate B, carries two arms $q^3$ $r^3$. The end of the arm $q^3$ buts against the point of the levelling screw $h^2$, previously referred to, which is attached to the frame of the right hand photogoniometer. The other arm $r^3$ is disposed opposite the middle support $m^3$ of the guide bar of the mapping system and carries a pivot $s^3$ of which the distance from the polar axis is made equal to the distance of the pivot $n^3$ of the supporting arm $m^3$ from the parallel axis of the mapping system. Further a coupling rod, or pair of rods $t^3$, of which the lengths are equal to the distance between the parallel and the polar axes of the instrument, connects the pivots $s^3$ with the pivot $n^3$. The two arms $m^3$ and $r^3$ forming with the coupling rods $t^3$, three sides of a parallelogram their rotations and that of the pair of photogoniometers will be equal and similar.

The varying of the inclination and of the height of the drawing board $n^3$ is effected in the following manner: Four angle bars $u^3$ are attached to the lower surface of the drawing board, perpendicularly to its plane and connected at their lower ends by a plate $v^3$, thus forming a kind of box with open sides. This box can slide up and down in another similar box formed by a lower table $w^3$ four angle bars $x^3$ and bracing members $y^3$. The movement of the upper box out of the lower is regulated by means of a screw $z^3$ which has a collar $a^4$ in the centre of the lower table and a nut $b^4$ in the centre of the bottom plate $v^3$ of the upper box, but may be otherwise arranged. The inclination of the pair of boxes and therefore that of the drawing boards is made adjustable by pivoting the lower box at $c^4$ on uprights $d^4$ from the lower base plate C of the apparatus. The axis of the pivots $c^4$ is horizontal and in a plane perpendicular to the polar axis. Two levelling screws $e^4$ of which the nuts are fixed to the base plate C serve to clamp the table at the desired inclination, which is measured by a graduated arc of circle $f^4$ attached to the lower table and an index mark $g^4$ attached to the lower base plate or vice versa.

To transmit the rotation of the screw actuating the rise and fall of the drawing board to a conveniently placed hand wheel $h^4$ (Fig. 1) the following arrangement is devised: A shaft $i^4$ is disposed in the line of the pivots $c^4$ of the lower table. This shaft is supported by bearings $j^4$ formed in projections from the lower base plate C. At one end of this shaft is keyed a bevel gear wheel $k^4$ which engages a similar bevel gear wheel $l^4$ keyed to the head of the screw $z^3$. On this shaft is also keyed a third bevel gear wheel $m^4$ which engages a fourth similar wheel $n^4$ keyed to the end of a horizontal shaft $o^4$ which serves to transmit the motion to the hand wheel $h^4$, a pair of spur gear wheels being interposed at $p^4$ to allow the hand wheel at the further end of an auxiliary parallel shaft, $q^4$ to be raised to a convenient level above the base plate C. The shaft $i^4$ being in line with the pivots $c^4$ and this line passing through the axis of the gear wheel $l^4$ it follows that wheels $k^4$ and $l^4$ will remain in mesh for any inclination of the drawing board resulting from the adjustment of the levelling screws $e^4$.

After the pair of plates have been set in correspondence the adjustment of the mapping system is effected in the following manner. Firstly the length of the base is set off, on the scale desired for the map, by sliding the box $v^2$ to the appropriate reading of its graduated scale $r^4$ which measures the separation of the pivot centres of the guide sleeves $c^2$ and $r^2$. The box is then clamped in position by means of the screws $s^4$. Secondly, the left hand mapping rod is made vertical when the line of collimation of the left hand telescope is set perpendicularly to the polar axis, that is to say for 90° reading on the circle of the corresponding mirror slide and the distance rod $a^3$ clamped to the same slide. Thirdly, the right hand mapping rod is made vertical when the line of collimation of the right hand telescope is set perpendicularly to the polar axis and the box $h^3$ is then clamped to its caliper by means of the screws $i^3$. Fourthly, the pair of rods being set in a vertical plane, the pair of photogoniometers are rotated together round their polar axis by turning the screw $h^2$ until the reading on the auxiliary arc $i^2$ corresponds with the computed amount of rotation $\theta$ which would be necessary to bring a trace on the photographs of the vertical plane of the base line into the horizontal measuring plane of the apparatus. Fifthly, the drawing board is set to the computed inclination $i$ of the base line. The mapping system is now set for either drawing contour lines at determinate heights read from a computed zero on the scale $u^4$, the hand wheel $h^4$ being in such case kept fixed for each height, or for drawing orthogonal projection of the topographical features, in which case the sighting marks are kept in apparent contact with the features to be mapped by means of the hand wheel. In both cases the necessary motion is also imparted to the mirror slides and to the pair of photogoniometers by moving with the right hand the pencil carrier over the surface of the paper. If a cutting tool is substituted for the pencil a solid model may be carved by the tool.

Claims:

1. An apparatus for photographic surveying, in combination, a binocular telescope provided with a mark system, two universally movable photogoniometers each adapted to hold a photograph taken from the ends of a base line at different angles and each carrying an objective disposed in the centre of projection of the photograph, a set of pivots in line forming a horizontal axis of rotation common to both photogoniometers and coinciding substantially with the line joining the front nodal points of the two photogoniometer objectives, means for imparting equal amounts of rotation of the two photogoniometers round this axis, and a reflecting system comprising for each photogoniometer a slide movable in a direction parallel to that of the common photogoniometer axis, a reflector mounted on a vertical axis of rotation on said slides, a horizontal lever also pivoted vertically on said slides, and means for coupling the reflector with the lever and the slide, these means being adapted to impart to the reflector a rotation equal to half the amount of rotation imparted to the lever by longitudinal motion of the slide.

2. An apparatus for photographic surveying, in combination, a binocular telescope provided with a mark system, two universally movable photogoniometers each adapted to hold a photograph taken from the ends of a base line at different angles and each carrying an objective disposed in the centre of projection of the photograph, a set of pivots in line forming a horizontal axis of rotation common to both photogoniometers and coinciding substantially with the line joining the front nodal points of the two photogoniometer objectives, means for imparting equal amounts of rotation of the two photogoniometers round this axis, a reflecting system comprising for each photogoniometer a slide movable in a direction parallel to that of the common photogoniometer axis, a reflector mounted on a vertical axis of rotation on said slides, a horizontal lever also pivoted vertically on said slides, and means for coupling the reflector with the lever and the slide, these means being adapted to impart to the reflector a rotation equal to half the amount of rotation imparted to the lever by longitudinal motion of the slide, and a mapping system comprising a drawing board, means for adjusting the inclination of the board to correspond with that of the base line, means for displacing the board in height while it remains parallel to itself, a copying tool moving freely over the plane of the drawing board, a pair of rods hinged together to the copying tool, sleeves through which said rods slide, and a pair of pivots terminating in a shaft on which said sleeves are disposed, said pivots determining an axis of rotation parallel to the axis of rotation determined by the pivots of the photogoniometers, means for coupling the rotation of the plane of the pair of rods with the rotation of the pair of photogoniometers about the common axis determined by their pivots, these means being adapted to make the two rotations constantly equal and similar, and means for transmitting to the respective slide of the mirror system the longitudinal motion, in a direction parallel to that of the axis determined by the photogoniometer pivots, of a point in the axis of each rod at a constant distance from the parallel axis of rotation of the rods, these means being adapted to make the two longitudinal displacements equal and similar.

In testimony whereof I affix my signature.

HENRY GEORGES FOURCADE.